No. 825,305. PATENTED JULY 10, 1906.
C. ELLIS.
APPARATUS FOR MANUFACTURING CEMENT.
APPLICATION FILED MAY 5, 1905.
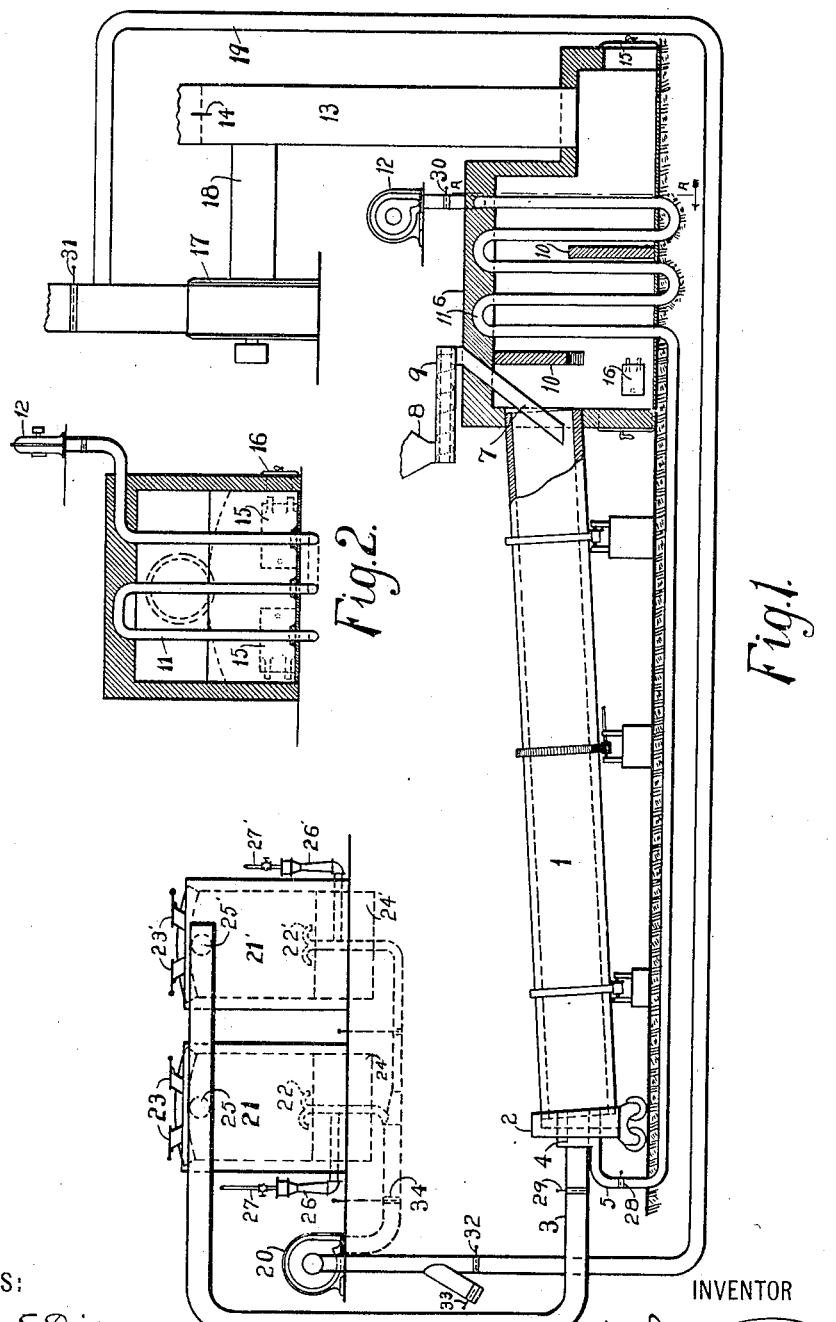

UNITED STATES PATENT OFFICE.

CARLETON ELLIS, OF NEW YORK, N. Y., ASSIGNOR TO COMBUSTION UTILITIES COMPANY, OF NEW YORK, N. Y., A CORPORATION OF NEW YORK.

APPARATUS FOR MANUFACTURING CEMENT.

No. 825,305. Specification of Letters Patent. Patented July 10, 1906.

Application filed May 5, 1905. Serial No. 259,038.

*To all whom it may concern:*

Be it known that I, CARLETON ELLIS, a citizen of the United States, and a resident of New York city, in the county of New York and State of New York, have invented certain new and useful Improvements in Apparatus for Manufacturing Cement, of which the following is a specification.

This invention relates to apparatus for the regeneration of the heat now lost in the stack-gases of the kiln used in the manufacture of Portland cement. Efforts have been made to use certain devices for this purpose; but their construction has been such that satisfactory results have not been attained, for one reason, among others, that means for the removal of the dust coming from the kiln with the gases was not given proper attention.

The object of the present invention is to regenerate a portion of the stack-gas waste heat by preheating air, which may be used for the support of combustion in the kiln.

In the accompanying diagrammatic drawings, Figure 1 represents a longitudinal section of a kiln; and Fig. 2 a section of the kiln-housing, taken along the line A A of Fig. 1.

In the drawings, 1 is a rotary kiln having the header 2, the fuel-inlet 3, air-inlet 4, air-blast connection 5, the housing and regenerative chamber 6, feeding-chute 7, hopper 8, and conveyer 9 for introducing the raw material into the kiln.

10 10 are partitions which act as dust-baffles.

At 11 are shown a series of vertical pipes, through which air is forced by means of the fan-blower 12.

13 is a stack having the damper 14.

15 and 16 are clean-out doors.

17 is a blower or exhauster which may be used, if desired, for the purpose of producing an induced draft. 18 is a flue connecting this fan with the stack 13.

19 is a conduit extending to the fan 20, by means of which products of combustion are entered into the gas-producers 21 21 through the twyers 22 22. The gas-producers have feed-hoppers 23 for the introduction of fuel, water seals 24, gas-outlets 25, steam-blowers 26, and the steam-jets 27. The dampers or valves 28, 29, 30, 31, 32, 33, and 34 regulate the flow of the gases through the various conduits above mentioned.

In the operation of this apparatus the fan 12 is caused to pass air through the regenerating-pipes 11 into the conduit 5 to the distributing-inlet 4. The gas-producers 21 21 deliver gas through 3 into the kiln, where by mixture with the preheated air through 4 an intense and rapid combustion is effected.

The flues 11 are shown in the accompanying diagrammatic drawings arranged vertically. This is the most satisfactory arrangement, owing to the fact that dust cannot readily lodge on the pipes and prevent the absorption of heat from the stack-gases. A horizontal arrangement of these flues of course is also possible. When the flues are made of metal—as, for instance, of cast-iron—it is often desirable to make the castings with corrugations which admit of greater heating-surface per unit of length than would be secured from ordinary pipe. The air-blast may be drawn through the regenerating-flues by means of a fan-blast in the conduit 5.

I do not limit myself to the exact form of construction herewith shown, as many modifications of this apparatus will be evident to one skilled in the art to which this invention appertains; neither do I limit myself to the use of gaseous fuel, as powdered coal or oil may also be used with my apparatus to advantage.

What I claim is—

1. Apparatus for making cement comprising an inclined rotary kiln fuel-feeding means at the lower end, a housing inclosing the upper end, spaced air-heating flues in said housing, a pipe connection delivering heated air from the flues to the fuel-feeding means at the lower end of the kiln, means in said housing for causing a deposition of dust and means for permitting the removal of dust from the housing.

2. Apparatus for making cement comprising an inclined rotary kiln, a housing inclosing the upper end, a blast gas-burner at the lower end, air-heating flues in said housing, a pipe connection delivering heated air from the flues to the blast gas-burner, means in said housing to cause the deposition of dust and means for permitting the removal of the dust.

3. Apparatus for making cement comprising an inclined rotary kiln, fuel-feeding means at the lower end of the kiln, a housing inclosing the upper end, air-heating flues spaced apart to permit cleansing in said housing, doors in the housing permitting access between the flues, a pipe connection delivering heated air from the flues to the fuel-feeding means, and means in the housing for causing the deposition of dust.

4. Apparatus for making cement comprising a rotary kiln, fuel-feeding means at the lower end of the kiln, a housing inclosing the upper end, air-heating flues in the housing, dust settling and collecting means in the housing, and a pipe connection delivering heated air from the flues into the fuel-feeding means.

5. Apparatus for making cement comprising a rotary kiln, a housing inclosing the upper end, fuel-feeding means at the lower end, baffle-plates in the housing for causing a deposition of dust, air-heating flues also in the housing and spaced apart to permit cleansing, doors in the housing permitting access between the flues and a pipe connection delivering heated air from the flues into the fuel-feeding means.

6. Apparatus for making cement comprising a rotary kiln, a housing inclosing the upper end, gas-firing means at the lower end, baffle-plates in the housing causing a circuitous passage of waste kiln-gases therein and deposition of dust, air-heating flues also in the housing between said baffle-plates and spaced apart to permit cleansing, doors in the housing permitting access between the flues, and a pipe connection delivering heated air from the flues to the gas-firing means.

7. Apparatus for making cement comprising a kiln, a dust-collecting housing for the gas-exit end of the kiln, air-heating flues in the housing, a pipe connection from the flues to the other end of the kiln, a gas-producer delivering gas into the kiln near said pipe connection, and a pipe connection for delivering waste gases from a point beyond said housing into the gas-poducer.

Signed at New York city, in the county of New York and State of New York, this 3d day of May, A. D. 1905.

CARLETON ELLIS.

Witnesses:
WARREN E. DIXON,
A. M. SENIOR.